United States Patent Office 2,831,768

Patented Apr. 22, 1958

2,831,768

POLYMERIC LIGHT-SENSITIVE PHOTOGRAPHIC ELEMENTS

Stewart H. Merrill, Cornelius C. Unruh, and Earl M. Robertson, Rochester, N. Y., assignors to Eastman Kodak Company, Rochester, N. Y., a corporation of New Jersey No Drawing. Application January 19, 1956
Serial No. 560,060

6 Claims. (Cl. 96—115)

This invention relates to photographic elements comprising polymeric light-sensitive layers which can be sensitized to further increase their photographic speed.

The light-sensitive constituents of the light-sensitive layers are polymeric bodies to the recurring polymeric units of which are attached directly or indirectly the arylphenone group

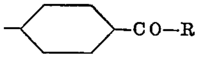

wherein R represents an aromatic radical of the benzene or naphthalene series such as either a benzene or naphthalene radical substituted or not, e. g. phenyl, naphthyl, p-chlorophenyl, p-methoxyphenyl, etc.

In addition to the light-sensitive polymers just mentioned, the light-sensitive layers contain certain comparatively high molecular weight alcohols which behave as sensitizing agents for the polymers and thus appreciably increase the photographic speed of the systems. These sensitizing agents are ethyl 12-hydroxy-stearate, Michler's hydrol (p,p'-dimethylaminobenzhydrol), 12-hydroxystearic acid and borneol.

In this description of our invention, when referring to the "speed" of the light-sensitive polymeric compositions, we mean a value representing the relative amount of light required to insolubilize the compositions; that is, the layers of the polymeric compositions are tested for speed by exposure under a graduated photographic step tablet followed by washing off the unexposed portions with a suitable solvent. From the nature of the insoluble relief image remaining on the support, a speed value is calculated and assigned to the given polymer. This method of estimating speed of course simulates the method employed for utilizing the compositions for photomechanical purposes. That is, the polymeric compositions are useful for forming resist images for printing purposes, for example, by coating a layer of the compositions on a support such as zinc, aluminum or magnesium plates followed by exposure to a subject such as a line or halftone subject and then washing off the residual unexposed polymer and either printing directly from the resist image obtained or etching the plate before printing by conventional methods.

Representative polymers of the invention are as follows:

(1) Polyvinyl benzophenone
(2) Polyvinyl-p-chlorobenzophenone
(3) Polyvinyl-p-methoxybenzophenone
(4) Polyvinyl-β-naphthophenone
(5) Polyvinyl-o-carboxybenzophenone
(6) Addition product of 4-(β-hydroxyethoxy) benzophenone to styrene-maleic anhydride heteropolymer
(7) p-Benzoylphenoxyacetate of polyvinyl alcohol
(8) p-Benzoylphenoxyacetate of partially hydrolyzed cellulose acetate These polymers are prepared as shown in the following examples:

*Example 1.—Polyvinylbenzophenone*

To 40 g. of benzoyl chloride and 34 g. of aluminum chloride in 250 ml. of carbon disulfide was added slowly, with stirring, 26 g. of polystyrene dissolved in 250 ml. of carbon disulfide. After two hours the solid was removed by filtration and dried in air. This material was added to 2 liters of 2 percent hydrochloric acid and stirred for two hours. The solid polymer was then recovered by filtration, washed, and dried at 35°. It was then dissolved in 1 liter of benzene, filtered, and precipitated by pouring in a slow stream into agitated diethyl ether. A fine white powder (36 g.) was obtained after drying. The polymer is soluble in benzene, chloroform, dioxane, and methyl ethyl ketone.

*Analysis.*—Calcd. for $C_{15}H_{12}O$ (100% reaction): C, 87.0; H, 5.8. Found: C, 87.0; H, 6.5.

A two percent solution of this polymer in dioxane was coated on a grained zinc plate by whirling the solution onto the surface at 78 R. P. M. The coating was exposed under a line negative to a sunlamp for two minutes at 10 inches. The coating was developed for two minutes in dioxane and the plate was inked for printing purposes. A clean positive image was obtained corresponding to that on the negative.

*Example 2.—Polyvinyl-p-chlorobenzophenone*

To 21.5 g. of p-chlorobenzoyl chloride and 15 g. of aluminum chloride in 200 ml. of carbon disulfide cooled to 15° was added over a period of 10 minutes a solution of 11.5 g. of polystyrene in 150 ml. of carbon disulfide. The temperature rose to 27° and solid material began to separate. When the precipitation appeared complete (10 minutes), the soft particles were separated by filtration and dried in air. The polymer was recovered as in Example 1 except that the reprecipitation was from 150 ml. of dioxane into agitated methanol. A white, fibrous polymer (16 g.) was recovered which was soluble in benzene, chloroform, dioxane, and methyl ethyl ketone.

*Analysis.*—Calcd. for $C_{15}H_{11}OCl$ (100% reaction): Cl, 14.6. Found: Cl, 9.6.

A coating was made, exposed, and developed as described under Example 1, and an image was obtained which corresponded to the negative used.

*Example 3.—Polyvinyl-p-methoxybenzophenone*

To 15 g. of p-methoxybenzoyl chloride and 11.5 g. of aluminum chloride in 100 ml. of a 50–50 mixture of nitrobenzene and 1,1,2,2-tetrachloroethane was added slowly with stirring 8.8 g. of polystyrene dissolved in 80 ml. of the same mixed solvent. After two hours of stirring, the mixture was poured into 500 ml. of 3 percent hydrochloric acid and stirred vigorously for a half hour. The excess water was then decanted off, and the polymer was precipitated by pouring the remainder into 2 liters of methanol. The product was recovered by filtration, washed with fresh methanol, and dried in air. Reprecipitation from methyl ethyl ketone into methanol yielded 12 g. of white, fibrous polymer soluble in benzene, chloroform, and dioxane.

*Analysis.*—Calcd. for $C_{16}H_{14}O_2$ (100% reaction): $CH_3O$, 13.0. Found: $CH_3O$, 7.6.

A coating was made from this polymer, exposed, and developed as described in Example 1 to give an image corresponding to that on the negative used.

*Example 4.—Polyvinyl-β-naphthophenone*

The procedure of Example 1 was followed with 15 g. of β-naphthoyl chloride and 9.8 g. of aluminum chloride in 75 ml. of carbon disulfide and 7.5 g. of polystyrene in 75 ml. of carbon disulfide. The reaction mixture was stirred for 17 hours before removing the solid product.

The polymer was purified by reprecipitation from 350 ml. of dioxane into water which yielded 14 g. of yellow, fibrous polymer soluble in benzene, chloroform, and dioxane.

*Analysis.*—Calcd. for $C_{19}H_{14}O$ (100% reaction): C, 88.4; H, 5.4. Found: C, 85.3; H, 5.9.

This polymer was coated, exposed, and developed as described in Example 1. An image was obtained which corresponded to that on the negative used.

*Example 5.—Polyvinylbenzophenone-o-carboxylic acid*

To 13 g. of polystyrene and 35 g. of aluminum chloride in 450 ml. of 1,1,2,2-tetrachloroethane was added over a period of 10 minutes a solution of 18.5 g. of phthalic anhydride in 100 ml. of tetrachloroethane. The mixture was stirred for 24 hours, the precipitated solid was filtered off, dried in air, and dissolved in methyl ethyl ketone. After filtration the solution was poured into agitated water to precipitate the polymer. Air drying yielded 22 g. of tan-colored, granular polymer soluble in aqueous alkalies.

*Analysis.*—Calcd. for $C_{16}H_{12}O_3$ (100% reaction): $CO_2H$, 17.9. Found: $CO_2H$, 14.2.

The light sensitivity of this polymer was demonstrated in the manner described under Example 1. Instead of zinc an aluminum surface was used.

*Example 6.—Preparation of 4-(β-hydroxyethoxy)benzophenone*

A solution of 8 g. of sodium hydroxide and 37 g. of 4-hydroxybenzophenone in 100 ml. of water was prepared, and to it was added 15 g. of ethylene chlorohydrin. This mixture was heated on a steam bath for 17 hours during which time an oil collected at the bottom of the flask. On cooling the oil solidified; it was collected and recrystallized twice from aqueous alcohol at 30° C. which yielded 30 g. (65%) M. P. 87–88°.

*Analysis.*—Calcd. for $C_{15}H_{14}O_3$: C, 74.4; H, 5.8. Found: C, 74.8; H, 5.9.

*Example 7.—4-(β-hydroxyethoxy)benzophenone ester of styrene-maleic anhydride heteropolymer*

To a solution of 12.1 g. of styrene-maleic anhydride heteropolymer (1 to 1) in 120 ml. of dry pyridine was added 14.5 g. of 4-(β-hydroxyethoxy)benzophenone (Example 6). The resultant solution was heated at 80° C. for 4.5 hours, then diluted wtih 150 ml. of acetone and poured slowly into 2 liters of agitated 10 percent acetic acid. After washing with ethanol the solid was dissolved in 200 ml. of acetone and reprecipitated in water to give a white, fibrous polymer soluble in dioxane and moist methyl ethyl ketone.

*Analysis.*—Calcd. for $C_{27}H_{24}O_6$ (100% reaction): C, 73.0; H, 5.4. Found: C, 70.1; H, 5.7.

This polymer, coated on aluminum, was exposed and developed as described under Example 1 to give an image which corresponded to that on the negative used.

*Example 8.—Preparation of p-benzoylphenoxyacetyl chloride*

A mixture of 19 g. of chloroacetic acid and 40 g. of 4-hydroxybenzophenone was melted on the steam bath. A solution of 17 g. of sodium hydroxide in 100 ml. of water was added in portions while stirring. The resulting solution was stirred on the steam bath for 16 hours during which time the sodium salt of p-benzoylphenoxyacetic acid crystallized. After cooling, the salt was collected and washed with cold water. It was added to 500 ml. of water, sufficient hydrochloric acid was added to acidify, and the suspension was stirred for two hours. The free acid was collected and dried. After recrystallization from ethanolbenzene, 22 g. (42%) of acid, M. P. 151–153° C., was obtained. p-benzoylphenoxyacetic acid was previously prepared by a slightly different method by Torres, An. Soc. espan., 24, 88 (Zentral., 1926, II, 21) who reported M. P. 154–155°.

The p-benzoylphenoxyacetic acid was refluxed two hours in 100 ml. of thionyl chloride. Following vacuum evaporation to near dryness the solid acid chloride was recrystallized from benzene-hexane which gave 19 g. of product, M. P. 110–112°.

*Example 9.—Polyvinyl alcohol ester of p-benzoylphenoxyacetic acid*

One and six-tenths g. of polyvinyl alcohol (medium viscosity, Elvanol 71–30) was swollen by stirring for two hours with 40 ml. of dry pyridine while heating on the steam bath. To the cooled mixture was then added 10.3 g. of p-benzoylphenoxyacetyl chloride in small portions. The reaction mixture was then stirred for two hours while heating at 50–65° C. After dilution with 100 ml. of methyl ethyl ketone, the mixture was poured into agitated methanol. The solid product was collected and dried, then redissolved in chloroform, filtered, and reprecipitated in methanol which yielded 8 g. of tan-colored polymer soluble in dioxane.

*Analysis.*—Calcd. for $C_{17}H_{14}O_4$ (100% reaction): C, 72.9; H, 5.0. Found: C, 71.8; H, 5.3.

The polymer, coated on a hydrophilic lithographic paper base, was exposed as described in Example 1, developed in chloroform, and inked. An image corresponding to that on the negative was obtained which could be printed on a lithographic press.

*Example 10.—Partially hydrolyzed cellulose acetate ester of p-benzoylphenoxyacetic acid*

The procedure of Example 9 was followed except that 4 g. of partially hydrolyzed cellulose acetate (24% acetyl) was substituted for the polyvinyl alcohol. The cellulose acetate was in solution with 75 ml. of dry pyridine. Again a tan-colored, dioxane-soluble polymer was obtained.

The light sensitivity of this polymer was demonstrated in the manner described in Example 9. The exposure was for 10 minutes.

*Example 11*

The sensitizing effect of the mentioned sensitizing agents is illustrated in the following table wherein "solvent" indicates the solvent used for coating and developing the various polymers to obtain images on the support. The sensitizers were used in the compositions in the amount of 10 percent of the weight of polymer present. On the same speed scale as shown in the table, bichromated colloid layers such as bichromated casein and aluminum would have a speed value of about 30.

| Polymer | Solvent | Sensitizer | Speed |
|---|---|---|---|
| Polyvinylbenzophenone. | methyl Cellosolve acetate. | | 90 |
| Do | do | ethyl 12-hydroxystearate. | 260 |
| Do | do | Michler's hydrol | 260 |
| Do | do | 12-hydroxystearic acid. | 180 |
| Do | do | borneol | 130 |
| Polyvinyl-β-naphthophenone. | chlorobenzene | | 20 |
| Polyvinyl-p′-chlorobensophenone. | 2-butanone | | 4 |
| Polyvinyl-p′-methoxybenzophenone. | do | | 15 |
| Polyvinyl-p-benzoylphenoxyacetate. | chloroform | | 70 |

The mentioned sensitizing agents can be used similarly alone or in admixture for sensitizing coatings of the other polymers containing the recurring group

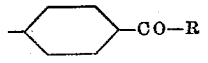

The sensitive compositions are useful wherever it is desired to form on a surface a highly hydrophobic image for printing, decorative or other purposes. To this end, coloring material such as dyes and pigments may be incorporated into the polymeric compositions either during the preparation of the light-sensitive coatings thereof or by bathing with solutions containing color materials after preparation of the polymeric relief images.

Other ingredients may be incorporated into the polymeric arylphenone compositions of the invention. These include other light-sensitive polymers such as polyvinyl cinnamate (U. S. 2,725,372), allyl starch and allyl sucrose. The latter are representative of inherently light-sensitive allyl ethers of carbohydrates which themselves may be used for the preparation of photomechanical resist images on various surfaces such as grained aluminum, zinc, magnesium, copper and surface-hydrolyzed cellulose ester plates, by merely coating these allyl ethers on the surfaces, exposing to line or half-tone subjects, and developing with solvents such as isopropyl alcohol. When these allyl ethers are used with the arylphenone polymers, the light-sensitivity of the former is improved.

What we claim is:

1. A photographic element comprising a support having thereon a light-sensitive layer of a mixture of (1) a member of the class consisting of 12-hydroxystearic acid, ethyl 12-hydroxystearate, p,p′-dimethylaminobenzhydrol, and borneol, and (2) a light-sensitive film-forming polymer selected from the class consisting of polyvinyl benzophenone, polyvinyl-p-chlorobenzophenone, polyvinyl-p-methoxybenzophenone, polyvinyl-β-naphthophenone, polyvinyl-o-carboxybenzophenone, addition product of 4-(β-hydroxyethoxy)benzophenone to styrene-maleic anhydride heteropolymer, p-benzoylphenoxyacetate of polyvinyl alcohol and p-benzoylphenoxyacetate of partially hydrolyzed cellulose acetate.

2. The element designated in claim 1 wherein the polymer is polyvinylbenzophenone.

3. The element designated in claim 1 wherein the polymer is the 4-(β-hydroxyethoxy)benzophenone ester of a styrene-maleic anhydride heteropolymer.

4. The element designated in claim 1 wherein the polymer is a polyvinyl alcohol ester of p-benzoylphenoxyacetic acid.

5. The element designated in claim 1 wherein the polymer is a partially hydrolyzed cellulose acetate ester of p-benzoylphenoxyacetic acid.

6. The element designated in claim 1 wherein the polymer is a polyvinyl-o-carboxybenzophenone.

References Cited in the file of this patent

UNITED STATES PATENTS 2,180,730 Cox ------------------- Nov. 21, 1939

FOREIGN PATENTS 461,495 Great Britain ----------- Feb. 11, 1937
484,599 Great Britain ----------- May 9, 1938